May 5, 1959          C. R. PATON          2,885,219
REAR WHEEL SUSPENSION
Filed March 7, 1957          2 Sheets-Sheet 1
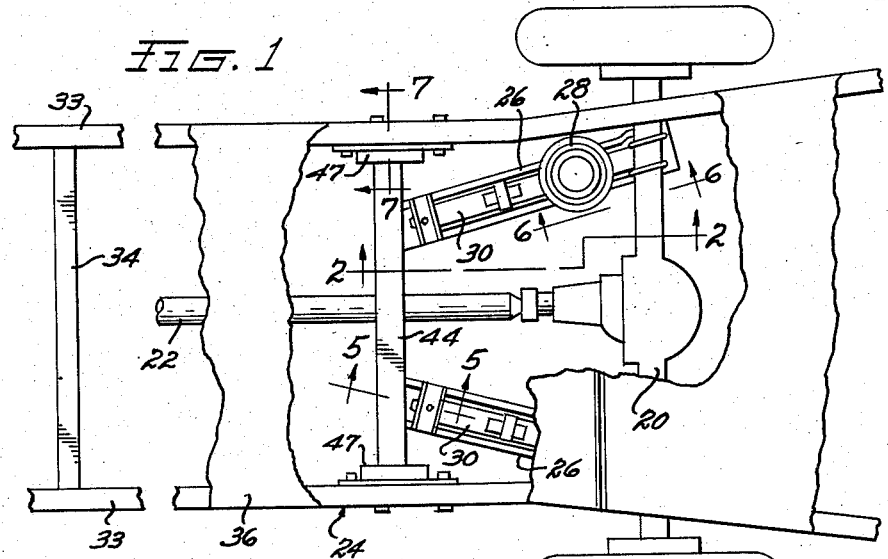
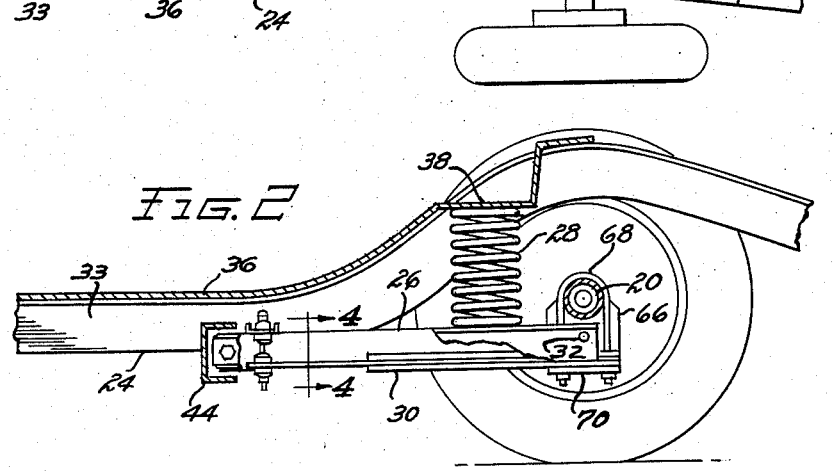
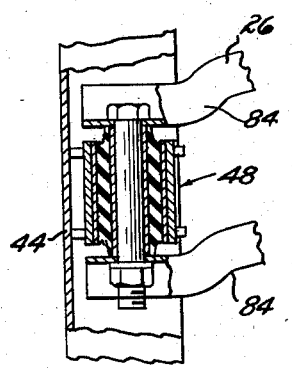
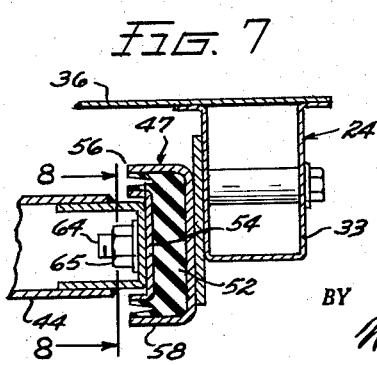
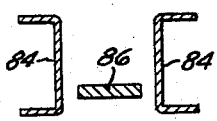
INVENTOR.
CLYDE R. PATON.
BY
Wallace P. Lamb
ATTORNEY.

May 5, 1959 C. R. PATON 2,885,219
REAR WHEEL SUSPENSION
Filed March 7, 1957 2 Sheets-Sheet 2
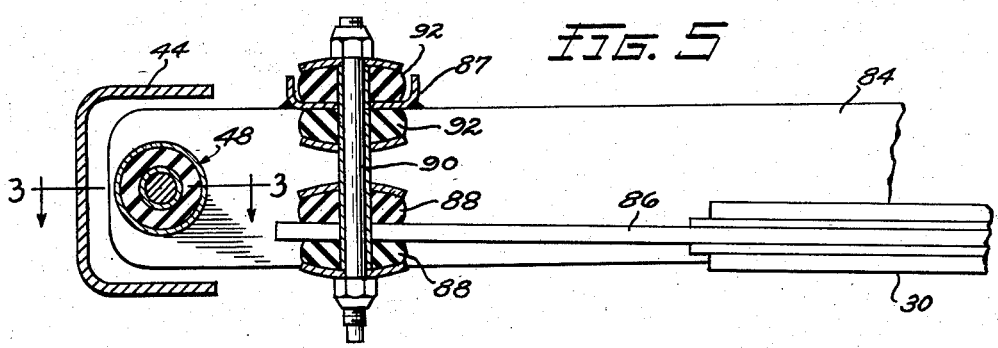
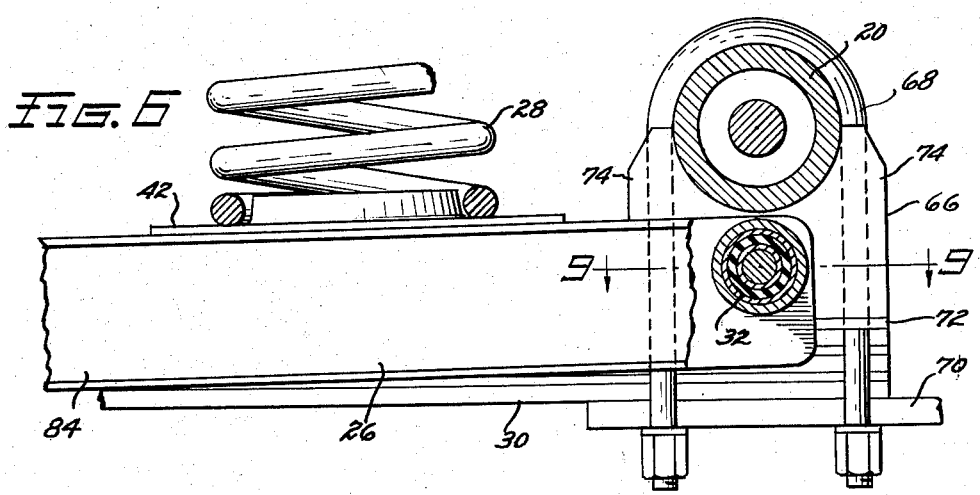
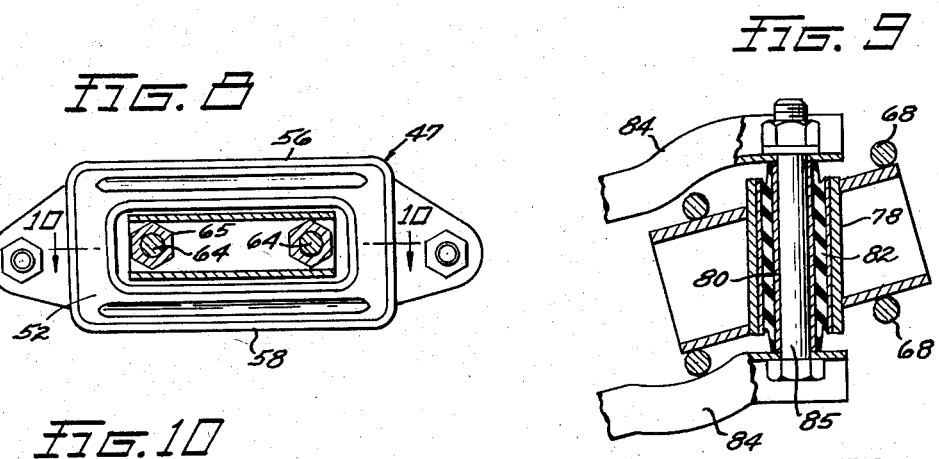
INVENTOR.
CLYDE R. PATON.
BY
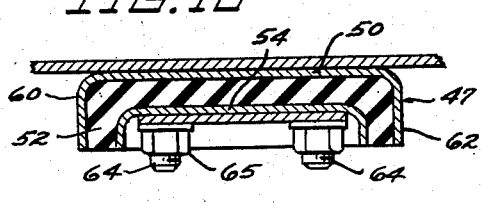
ATTORNEY.

United States Patent Office 2,885,219
Patented May 5, 1959

2,885,219

REAR WHEEL SUSPENSION

Clyde R. Paton, Birmingham, Mich.

Application March 7, 1957, Serial No. 644,648

3 Claims. (Cl. 280—124)

This invention relates generally to motor vehicles and particularly to rear wheel suspension therefor.

One of the objects of the invention is to provide for motor vehicles, an improved rear wheel suspension and drive connection between the rear axle housing and the vehicle body or underbody frame to effect improved ride quality.

Another object of the invention is to provide a rear wheel suspension of a character which will effect improved vehicle riding qualities throughout the range of high and low vibrations likely to be encountered by, or originate in motor vehicles, that would affect the ride quality.

Another object of the invention resides in the provision of an improved combination drive and rear wheel suspension in which radius arms, spring suspensions, leaf springs, and torsion connections coact in cushioning a motor vehicle body on a rear axle housing against both road and vehicle power plant induced vibrations.

Another object of the invention is to provide an improved combination drive and wheel suspension of the above mentioned character having improved stability characteristics without detracting from the ride quality.

A specific object of the invention is to provide an improved drive and rear wheel suspension in which rigid radius arms and leaf springs both function together as driving connections between an axle housing and body, while at the same time flexing of the leaf springs is effected by reason of the provision of yieldable torsion connections between the rigid radius arms and the axle housing.

Another object of the invention is to provide an improved rear wheel suspension mechanism having such intercoaction of its elements as to reduce proportionally displacement of the suspension means yet maintain desired ride quality of the vehicle.

Other objects of the invention will become apparent from the following detail description, taken in connection with the accompanying drawings in which:

Fig. 1 is a fragmentary plan view partly broken away of a motor vehicle embodying features of the invention;

Fig. 2 is a fragmentary vertical sectional view, taken along line 2—2 of Fig. 1;

Fig. 3 is a fragmentary sectional view, taken along line 3—3 of Fig. 2;

Fig. 4 is a cross sectional view, taken along line 4—4 of Fig. 2;

Fig. 5 is a sectional view, taken along line 5—5 of Fig. 1;

Fig. 6 is a sectional view, taken along line 6—6 of Fig. 1;

Fig. 7 is a cross sectional view, taken along line 7—7 of Fig. 1;

Fig. 8 is a sectional view, taken along line 8—8 of Fig. 7;

Fig. 9 is a sectional view, taken along line 9—9 of Fig. 6; and

Fig. 10 is a sectional view, taken along line 10—10 of Fig. 8.

Broadly, my inventive concept involves the use of two pair of arms connecting a rear axle housing to an underbody frame with at least one of the pairs of arms functioning as yieldable drive connections between the housing and frame to counter the torque reaction of the housing, and the other of which pair of arms support the suspension spring means such that the same have reduced displacement action proportional to displacement of the rear wheels.

The motor vehicle represented in the drawings includes a conventional rear axle housing 20, a drive or propeller shaft 22, and an underbody frame 24. In the usual manner, the underbody frame 24 extends over the rear axle housing 20 and the propeller shaft 22 connects the vehicle power plant (not shown) to the rear wheels by means of the well known differential drive within housing 20. It will be noted that there is no fixed connection, such as a propeller shaft housing, connected to the axle housing 20, as the drive from the rear wheels of the vehicle shown is through my improved wheel suspension. With respect to the term "underbody frame" it will be appreciated by those skilled in the art that the term applies equally to either an integral body and underframe structure, or to the equally well known separate chassis type frame.

In accordance with my invention, I pivotally connect the rear axle housing 20 forwardly thereof to the frame 24 by a pair of laterally positioned radius arms 26, and suspend the frame on the rear axle housing 20 by suitably displaceable spring means, such as the pair of laterally positioned coil springs 28. The radius arms 26 and the coil springs 28 cooperate to provide ideal cushioning of the frame 24 against low frequency vibrations, such as result from the rear wheels engaging rises and depressions in a roadway, the arms 26 contributing mass and stability to the ride quality of the vehicle. If desired, air cushions, or other suitable displaceable resilient means may be substituted for the coil springs 28. In order to obtain ideal ride quality in a motor vehicle, it is necessary to cushion low frequency vibrations, such as those which are induced in the axle housing 20 by the driving action at the housing, particularly the torque action resulting from rapid acceleration, and also the high frequency vibrations induced in the housing 20 by road surface roughness. To this end, I provide a pair of laterally positioned leaf springs 30, connecting the housing 20 to the frame 24, and in order to render these leaf springs highly effective, I connect the housing 20 to the radius arms 26 by yieldable torsion connectors 32. As a result, the connectors 32 yield to the torque imposed on the housing by the rear axle drive action, and the resultant movement of housing 20 relative to the arms 26 flexes the leaf springs 30 to smooth out the high frequency vibrations. As will hereinafter be more fully understood, the radius arms 26, coil springs 28, leaf springs 30 and the torsion connectors 32 cooperate to cushion the body against vibrations over the entire range that normally affect the ride quality of motor vehicles.

Referring in detail to the vehicle of the drawings, the underbody frame 24 may comprise the usual side frame members 33 connected together by a suitable number of cross members 34 of which only one is shown. Overlying the top of the frame 24 is a body floor pan 36 which may be welded, or be otherwise suitably secured to the frame. Adjacent the rear axle housing 20, the floor pan 36 is formed with a horizontal flat area to provide a seat 38 for the upper ends of the coil springs 28, the lower ends of which seat on the radius arms 26. By having the springs 28 supported on the arms 26 I reduce displacement of the springs proportionally to the displacement of the vehicle rear wheels, which is particularly advantageous where air bags of an air ride system are substituted for springs 28.

The radius arms 26 extend forwardly from the axle housing 20 substantially horizontally and have the front ends thereof pivoted to a cross member 44 which is supported at its opposite ends on the frame side members 33. The rear ends of the radius arms 26 are attached to the axle housing 20 by the torsion connectors 32 to provide for movement of the housing relative to the arms for vibration cushioning purposes, but also to hold the housing to the frame 24 with a desired degree of stability while at the same time allowing up and down movement of the housing 20 against the action of the coil springs 28.

The body is cushioned against transmission of vibrations thereto from the axle housing 20 by resiliently mounting or floating the cross member 44 in soft rubber mountings 47. The soft rubber mountings 47 are located at opposite ends of the cross member 44 and are secured respectively to the opposite side frame members 32. In addition, if desired, the front ends of the arms 26 may be connected to the cross member 44 by rubber bushings 48 of the well known type shown in Fig. 3.

The rubber mountings 47 each comprise a fixed mounting plate 50, a block of soft rubber 52, and a movable mounting plate 54. The block of rubber 52 has one side and preferably its edges bonded to the fixed mounting plate 50 which has top and bottom flanges 56 and 58 and side flanges 60 and 62. The movable mounting plate 54 is bonded to the remaining exposed or inwardly facing side of the rubber block 50 and carries a stud 64 to receive a nut 65 to secure the ends of cross member 44 to the mountings. The rubber that confines the movable mounting plate 54 at top and bottom thereof and the rubber that confines the plate at front and rear thereof constitute means yieldingly acting to limit respectively movement of the rear ends of arms 26 vertically and horizontally.

The leaf springs 30 have butt ends that are respectively secured to the axle housing 20 by a pair of clamps 66, each of which includes the usual U-bolts 68 and bottom clamp plate 70. The clamps 66 each have a base 72 and integral, spaced uprights 74 provided with arcuate sockets on the upper ends thereof to engage the housing 20 and together with the U-bolts clamp the springs 30 securely to the housing. Secured in and to the clamps 66 below housing 20 are the torsion connectors 32, connecting the rear ends of the radius arms 26 to the spring clamps 66, and thus to the axle housing 20.

Each of the torsion connectors 32 comprises an outer metal sleeve 78, an inner metal sleeve 80, and an intermediate rubber sleeve or bushing 82. The rubber bushing 82 has the outer surface thereof bonded to the outer metal sleeve 78 and the inner surface thereof bonded to the inner metal sleeve 80. These torsion connectors 32 are arranged with the axes thereof parallel to the axis of the axle housing 20 and provide low static force against movement of the housing relative to arms 26 while at the same time connecting the housing to the arms for stable up and down movement in proper relation to the frame 24. The inner metal sleeve 80 is attached at the opposite ends thereof to the radius arms 26, whereas the outer metal sleeve 78 is welded or otherwise secured against movement to the spring clamp 66. Thus, the torque action on the axle housing 20 places the rubber bushings in shear instead of the torque being transmitted in full to the radius arms 26, and as previously mentioned the relative movement of the housing 20 will flex the leaf springs 30 to effect cushioning of the housing against vibrations.

The radius arms 26 may be economically fabricated by making them each of a pair of channel members 84 arranged with the webs thereof in spaced back-to-back relation providing a strong arm of beam-like cross section. The channel members 84 are spaced apart near the ends thereof by the bushings through which bolts 85 extend to secure the bushings to the channel members 84 and the channel members together. Also, the channel members 84 are secured together by the lower spring retainer 42 which is welded across the upper flanges of the channels, adjacent the rear ends thereof, and by an anchor plate 87 which is welded across the upper flanges of the channel members 84 adjacent the front ends of each of the radius arms 26.

The leaf springs 30 each comprise a number of spring leaves of which there are three in the present construction, and the leaves extend forwardly from the axle housing 20 substantially horizontally. Also, the springs 30 are arranged such that they extend respectively between the channel members 84 of the radius arms 26 and thus are substantially in the same horizontal plane as the arms. The intermediate leaf, as at 86, of each leaf spring extends beyond the ends of the other two leaves to provide a light, flexible end which is attached to and acts through the arms against the underbody frame 24. As shown in Fig. 5, the forward end 86 of the intermediate spring leaf is held between two rubber insulators or washers 88 on a vertical bolt 90 which is secured to the anchor plate 87 and thus to the arm 26. A pair of rubber insulators or washers 92 separate and insulate the bolt 90 at its upper end from the anchor plate 87.

During the operation of a vehicle having my improved combination rear wheel suspension and drive connection, the drive from the rear wheels is through the axle housing 20 and through both the radius arms 26 and leaf springs 30 to the underbody frame 24. The suspension springs 28 support the load of frame 24 on the axle housing 20, and the rigid radius arms 26 allow the housing 20 to move up and down against the suspension springs. The leaf springs 30 are free of the load of frame 24 and are flexed when the torque drive action at the rear axle housing 20 places the rubber bushings 82 under shear, allowing the housing to move relative to the radius arms 26. This movement flexes the forward ends of the leaf springs 30 which, as a consequence cushion the high frequency vibrations of the housing, smoothing them out, or decreasing the frequency and amplitude to render the vibrations negligible.

While I have shown and described my invention in considerable detail, it will be understood that the invention is to be limited only by the spirit and scope of the appended claims.

I claim:

1. In a motor vehicle, a rear axle housing, an underbody frame overlying said housing, resilient mountings on said underbody frame forwardly of said housing, a pair of laterally spaced rigid radius arms having their forward ends mounted on said resilient mountings, yieldable connections connecting the rear ends of said arms to said housing for limited movement of the housing relative to said arms, spring suspension means interposed between said underbody frame and said housing, and laterally positioned leaf springs connected at rear ends thereof to said housing and at forward ends to said arms adjacent the forward ends thereof.

2. In a motor vehicle, a combination rear wheel suspension and drive connection comprising, an underbody frame, a rear axle housing, a longitudinally extending leaf spring, a clamp connecting one end of said leaf spring to said housing, said spring having a forward end, a resilient mounting on said underbody frame forwardly of said housing, a radius arm having a forward end supported on said mounting, spring suspension means supporting said frame on said radius arm, a rubber bushing connecting the rear end of said arm to said clamp, and means attaching the forward end of said leaf spring to the arm adjacent the forward end thereof.

3. In a motor vehicle, a rear axle housing, an underbody frame including spaced side members overlying said axle, soft yieldable mountings on said side members, a cross member mounted on said mountings to turn about a transverse axis, a pair of laterally positioned radius arms having forward ends connected to said cross member, yieldable suspension means supporting said frame on said radius arms, torsion connectors connecting the rear ends of said arms to said housing to effect limited movement of the housing relative to said arms in response to the driving torque at the housing, and a pair of laterally positioned leaf springs having ends thereof attached to said housing and the other ends thereof attached to said arms to cushion movement of said housing relative to said arms.

References Cited in the file of this patent

UNITED STATES PATENTS

| | | |
|---|---|---|
| 1,990,941 | Hashimoto | Feb. 12, 1935 |
| 2,308,967 | Kuss | Jan. 19, 1943 |
| 2,367,817 | Brown | Jan. 23, 1945 |
| 2,699,935 | Meier | Jan. 18, 1955 |
| 2,726,857 | Giacosa | Dec. 13, 1955 |